United States Patent
L'Heureux et al.

(10) Patent No.: US 9,277,405 B2
(45) Date of Patent: Mar. 1, 2016

(54) ACCESS CONTROL INTERFACES FOR ENHANCED WIRELESS ROUTER

(71) Applicants: Israel L'Heureux, Monaco (MC); Mark D. Alleman, Portland, OR (US)

(72) Inventors: Israel L'Heureux, Monaco (MC); Mark D. Alleman, Portland, OR (US)

( * ) Notice: Subject to any disclaimer, the term of this patent is extended or adjusted under 35 U.S.C. 154(b) by 42 days.

(21) Appl. No.: 14/331,600

(22) Filed: Jul. 15, 2014

(65) Prior Publication Data

US 2015/0078357 A1 Mar. 19, 2015

Related U.S. Application Data

(63) Continuation of application No. 13/431,095, filed on Mar. 27, 2012, now Pat. No. 8,782,741.

(60) Provisional application No. 61/540,895, filed on Sep. 29, 2011.

(51) Int. Cl.
| | |
|---|---|
| H04L 29/06 | (2006.01) |
| H04W 12/06 | (2009.01) |
| H04W 12/08 | (2009.01) |
| H04L 29/08 | (2006.01) |
| H04W 84/12 | (2009.01) |

(52) U.S. Cl.
CPC ............... *H04W 12/06* (2013.01); *H04L 67/14* (2013.01); *H04W 12/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,374,300 B2 | 4/2002 | Masters | |
| 6,810,412 B1 | 10/2004 | Chang | |
| 8,347,384 B1 | 1/2013 | Preston | |
| 2002/0161884 A1 | 10/2002 | Munger | |
| 2006/0291481 A1 | 12/2006 | Kumar | |
| 2007/0097976 A1 | 5/2007 | Wood | |
| 2008/0165964 A1 | 7/2008 | Lewis | |
| 2008/0281606 A1 | 11/2008 | Kitts | |
| 2010/0162399 A1 | 6/2010 | Sheleheda | |
| 2011/0161293 A1 | 6/2011 | Vermeulen et al. | |
| 2012/0192258 A1* | 7/2012 | Spencer | H04W 12/06 726/7 |
| 2013/0275228 A1 | 10/2013 | Milazzo | |

(Continued)

OTHER PUBLICATIONS

United States Patent and Trademark Office, Office Action for U.S. Appl. No. 13/309,505, Office Communication, Feb. 4, 2015, 16 pages, United States.

(Continued)

*Primary Examiner* — Izunna Okeke
(74) *Attorney, Agent, or Firm* — Michael J. Andri

(57) ABSTRACT

A wireless router provides access control to information resources stored at the wireless router. The wireless router supports user profiles and/or device profiles that respectively enable user level and/or device level access control. The wireless router may register users via a user registration interface presented by the client device. The wireless router may register client devices using a device identifier. Requests to initiate a communication session may be received by the wireless router from client devices over a wireless local area network. The wireless router may authenticate a client device based on a device identifier and/or authenticate a user based on user credentials obtained via a login interface presented by the client device. The wireless router may control access to information resources stored at the wireless router during the communication session based, at least in part, on access privileges for the authenticated client device and/or authenticated user.

16 Claims, 4 Drawing Sheets

(56) References Cited

U.S. PATENT DOCUMENTS

2014/0025753 A1     1/2014   Gronowski
2014/0259147 A1     9/2014   L'Heureux et al.

OTHER PUBLICATIONS

United States Patent and Trademark Office, Search Information for U.S. Appl. No. 13/309,505, Office Communication, Feb. 4, 2015, 2 pages, United States.

United States Patent and Trademark Office, Examiner's Search Strategy and Results for U.S. Appl. No. 13/309,505, Office Communication, Feb. 4, 2015, 7 pages, United States.

United States Patent and Trademark Office, Office Action for U.S. Appl. No. 13/367,556, Office Communication, Apr. 13, 2015, 13 pages, United States.

United States Patent and Trademark Office, Search Information for U.S. Appl. No. 13/367,556, Office Communication, Apr. 13, 2015, 2 pages, United States.

United States Patent and Trademark Office, Examiner's Search Strategy and Results for U.S. Appl. No. 13/367,556, Office Communication, Apr. 13, 2015, 7 pages, United States.

United States Patent and Trademark Office, Office Action for U.S. Appl. No. 13/631,184, Office Communication, Jun. 3, 2015, 16 pages, United States.

United States Patent and Trademark Office, Search Notes for U.S. Appl. No. 13/631,184, Office Communication, Jun. 3, 2015, 16 pages, United States.

Israel L'Heureux et al., Applicants' Response to Office Action for U.S. Appl. No. 13/631,184, Oct. 5, 2015, 10 pages.

Israel L'Heureux et al., Applicants' Response to Office Action for U.S. Appl. No. 13/309,505, Aug. 28, 2015, 18 pages.

Israel L'Heureux et al., Applicants' Response to Office Action for U.S. Appl. No. 13/367,556, Sep. 14, 2015, 31 pages.

USPTO, Office Action and Search Information for pending U.S. Appl. No. 13/309,505, Jan. 10, 2014, USPTO, United States.

Israel L'Heureux, et al., Applicants' Response to Office Action for pending U.S. Appl. No. 13/309,505, Jul. 10, 2014, USPTO, United States.

USPTO, Interview Request and Summary for pending U.S. Appl. No. 13/309,505, Aug. 28, 2014, USPTO, United States.

Israel L'Heureux, et al., Applicants' Response to Office Action for pending U.S. Appl. No. 1/3/367,556, Mar. 24, 2014, USPTO, United States.

USPTO, Office Action and Search Information for pending U.S. Appl. No. 13/367,556, Jul. 16, 2014, USPTO, United States.

\* cited by examiner

ACCESS CONTROL INTERFACES FOR ENHANCED WIRELESS ROUTER

CROSS-REFERENCE TO RELATED APPLICATIONS

The present application claims priority to and is a continuation of U.S. patent application Ser. No. 13/431,095, titled ACCESS CONTROL INTERFACES FOR ENHANCED WIRELESS ROUTER, filed Mar. 27, 2012, issued as U.S. Pat. No. 8,782,741, which claims priority to and is a non-provisional of U.S. patent application Ser. No. 61/540,895, titled SMART ROUTER, filed Sep. 29, 2011, the entire contents of each are incorporated herein by reference in their entirety for all purposes. Accordingly, the present application claims the benefit of U.S. patent application Ser. No. 13/431, 095, and the present application claims the benefit of U.S. patent application Ser. No. 61/540,895 by way of U.S. patent application Ser. No. 13/431,095.

BACKGROUND

On-premises wireless routers provide wireless local area network (WLAN) access to client devices in both home and business environments. Wireless routers perform a number of different functions, including a router function, a wireless access point function, and a network switch function. Wireless routers are often connected to a wide area network (WAN), such as the Internet, via a high capacity communications link to provide client devices of the WLAN with high-speed access to network resources of the WAN. Wireless routers serve as gateways for multiple client devices to concurrently access wide area networks.

SUMMARY

A wireless router provides access control to information resources stored at the wireless router. The wireless router supports user profiles and/or device profiles that respectively enable user level and/or device level access control. The wireless router may register users by creating a user profile that contains registration information obtained via a user registration interface presented by the client device. The wireless router may register client devices by creating a device profile that contains the device identifier of the client device. Requests to initiate a communication session may be received by the wireless router from client devices over a wireless local area network. The wireless router may authenticate a client device based on a device identifier and/or authenticate a user based on user credentials obtained via a login interface presented by the client device. The wireless router may establish the requested communication session between the wireless router and the authenticated client device. The wireless router may control access to information resources stored at the wireless router during the communication session based, at least in part, on access privileges for the authenticated client device and/or authenticated user. Claimed subject matter, however, is not limited by this summary as other examples may be disclosed by the following written description and associated drawings.

DETAILED DESCRIPTION

Figure 1:
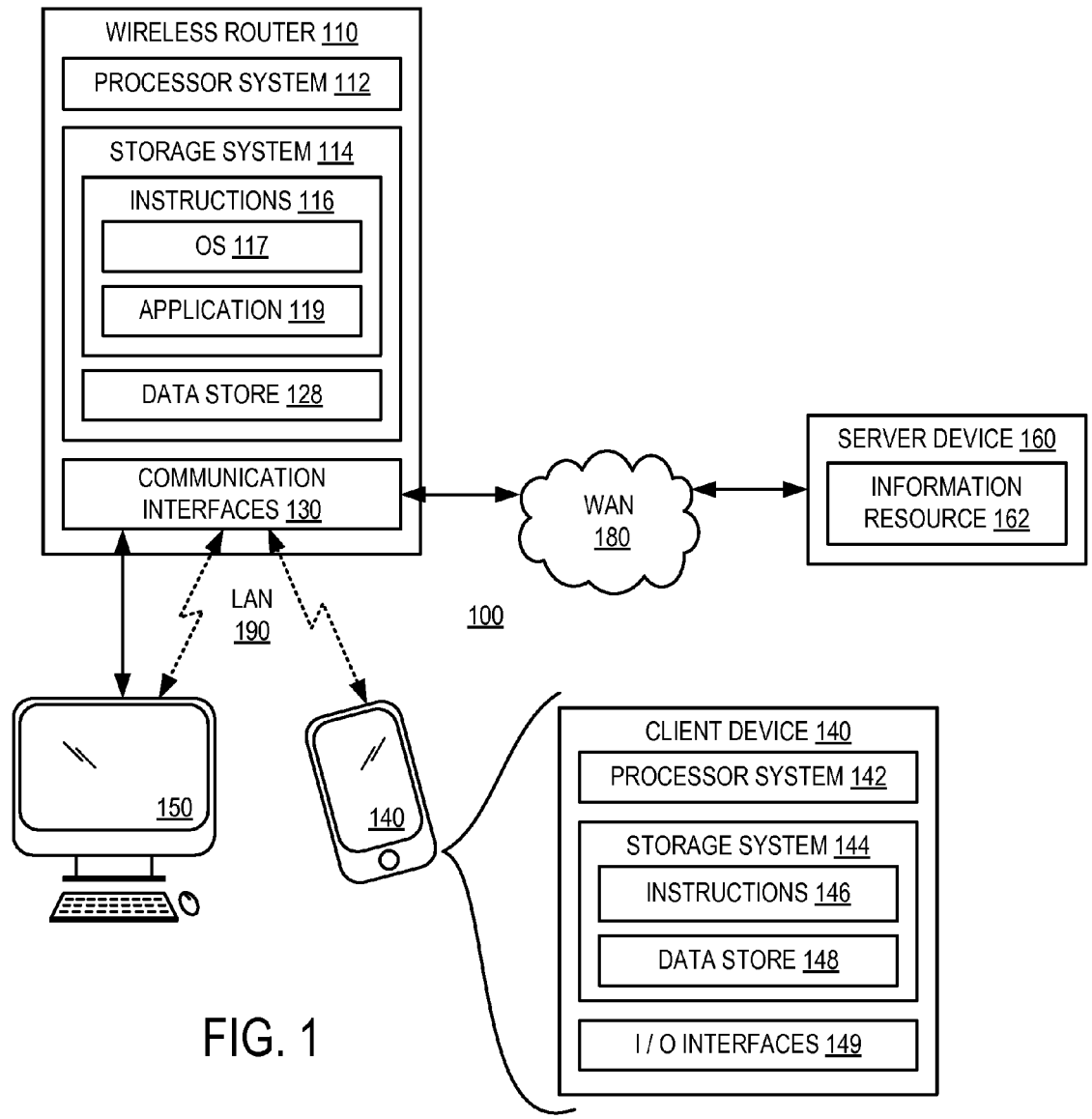
FIG. 1 is a schematic diagram depicting an example computing system according to a disclosed embodiment.

FIG. 1 is a schematic diagram depicting an example computing system 100 according to one disclosed embodiment. Computing system 100 includes a number of computing devices, such as a wireless router 110, one or more client devices (e.g., client devices 140, 150), and one or more network server devices (e.g., server device 160). Wireless router 110 may be positioned along a communications path between a wide area network (WAN) 180 and a local area network (LAN) 190. Wireless router 110 is depicted providing LAN 190 access for client devices 140 and 150, and is positioned at a boundary between LAN 190 and network server devices of WAN 180. Wireless router 110 may be implemented as on-premises equipment to provide LAN access to homes, residences, businesses, or other suitable LAN use environments. In at least some implementations, wireless router 110 may take the form of a private gateway or access point that is owned and/or operated by an owner or operator of the home, residence, business, or use environment in which the wireless router is deployed, in contrast to some public cellular network base stations.

Wireless router 110 includes communications interface 130 to support wired and/or wireless communications between client devices of LAN 190 and network server devices of WAN 180. Communications interface 130 may include one or more wired and/or wireless transceivers, modems, or other suitable electronic devices to facilitate communications with other computing devices. Communications interface 130 may provide or support a router function, a wireless access point function, and a network switch function. Wireless router 110 may establish communications sessions with client devices of LAN 190, and may route communications among these client devices and/or between these client devices and network server devices of WAN 180. As one example, client devices 140 and 150 may share information resources with each other via wireless router 110 and/or may request and receive information resources (e.g., information resource 162) from network server devices of the WAN (e.g., server device 160) via wireless router 110.

WAN 180 may take the form of the Internet or a portion thereof. LAN 190 may support wired and/or wireless communications between wireless router 110 and client devices 140 and 150. If supported, wired communications within LAN 190 may include Ethernet, powerline Ethernet, or other suitable form of wired communications. LAN 190 may support communications through any suitable type and/or number of wireless protocol standards. For example, LAN 190 may support one or more of the following standards: Wi-Fi (e.g., 802.11), Wi-MAX (e.g., 802.16), LTE (e.g., 3GPP TS 36), UMTS (e.g., 3GPP TS 25), CDMA, Bluetooth, or other suitable wireless protocol.

Wireless router 110 may include a processor system 112 to execute instructions 116. Processor system 112 may include one or more processors. Instructions 116 may be held in a storage system 114. Storage system 114 may include one or more storage devices. As one example, storage system 114 may take the form of non-volatile memory. For example, storage system 114 may include a hard drive, flash memory device, or other suitable non-volatile storage device. Wireless router 110 may further include volatile memory, which may be used in combination with non-volatile memory of storage system 114 by processor system 112 to execute instructions 116. Instructions 116 may include or take the form of software and/or firmware. For example, instructions 116 may include or form part of an operating system 117 of wireless router 110, an application program 119, a software component such as a plug-in, or other suitable instruction set, or combination thereof.

Wireless router 110 may perform a number of different functions, including a router function, a wireless access point function, a network switch function, an information resource storage function, and an access control function with respect to the stored information resources. In some implementations, functionality provided by wireless router 110 may be supported, at least in part, by associated (e.g., paired) instructions (e.g., software and/or firmware) executed at a client device and/or associated instructions (e.g., software and/or firmware) executed at a network server device. As one example, an operating system or application program of client device 140 (e.g., represented as instructions 146) may operate in combination with instructions 116 of wireless router 110. For example, an application program operating at client device 140 may initiate application programming interface (API) calls that may be received over LAN 190 by operating system 117 of wireless router 110 via an API. As another example, software residing at a network server device (e.g., server device 160) of WAN 180 may operate in combination with instructions 116 of wireless router 110.

Storage system 114 of wireless router 110 may include a data store 128. Information may be stored at and/or retrieved from data store 128 by processor system 112. Such information may include information resources (e.g., electronic files, programs, session states, etc.), device profiles, and user profiles, among other suitable information. A non-limiting example of data store 128 is described in greater detail with reference to FIG. 3. In contrast to traditional data caches, storage system 114 of wireless router 110 may additionally or alternatively contain short term information such as session data, and/or permanent or long term information such as profile information and information resources including objects such as data dictionaries, or renderable content such as chunks of movie data or other media content. Accordingly, wireless router 110 may include volatile storage such as RAM, non-volatile storage such as FLASH memory, a hard drive, etc.

Client devices 140 and 150 may take the form of a personal computer, mobile computing device, mobile communications device (e.g., Internet enabled phone), television set-top box, or other suitable electronic device. As one example, a client device, such as client device 140, may include a processor system 142 to execute instructions 146 held in storage system 144. Instructions 146 may include or take the form of software and/or firmware. For example, instructions 146 may form part of an operating system of client device 140, an application program, a software component such as a plug-in, or other suitable instruction set, or combination thereof. Instructions 146 may be executed by processor system 142 to present one or more of the interfaces described herein, for example, at a display device via input/output interfaces 149. Input/output interfaces 149 may receive user inputs directed at a keyboard, a touch-sensitive display device, a pointer device (e.g., a computer mouse), or other suitable input device. In at least some implementations, instructions 146 of client device 140 may be configured to operate in coordination with or may be paired with instructions 116 of wireless router 110. Storage system 144 may include a data store 148. Information may be stored at and/or retrieved from data store 148 by processor system 142. Some client devices, such as client device 140, may be further configured for WAN access without traversing wireless router 110. As one example, client device 140 may further support wireless connectivity via a mobile broadband technology such as, for example, 3G or 4G.

Figure 2:
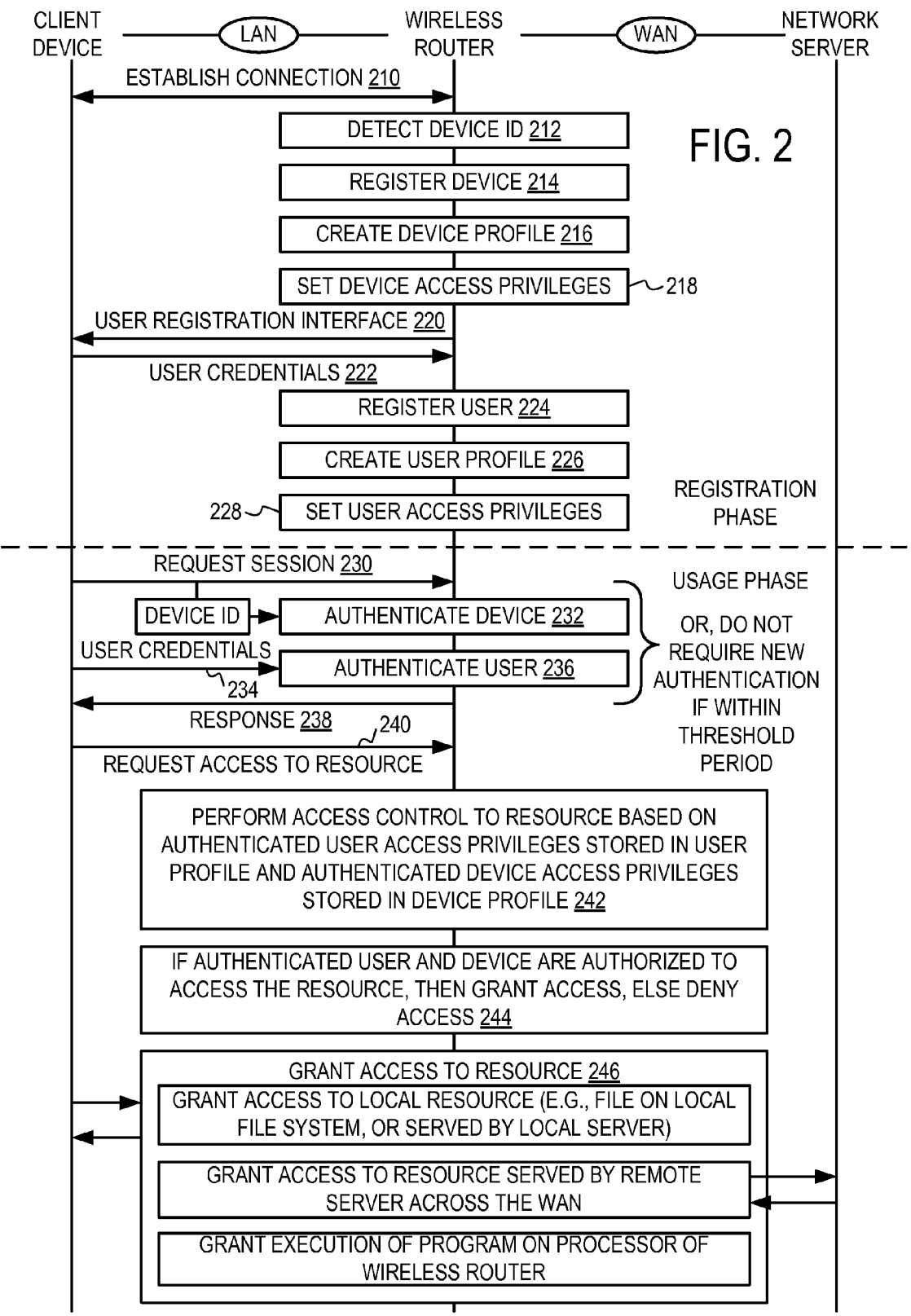
FIG. 2 is a flow diagram depicting an example networking method according to a disclosed embodiment.

FIG. 2 is a flow diagram depicting an example networking method 200. As a non-limiting example, method 200 may be performed, at least in part, by previously described wireless router 110 of FIG. 1. During a registration phase, the wireless router may establish a connection with a client device over the wireless local area network at 210. The wireless router may detect a device identifier (e.g., a MAC address or other suitable identifier) of the client device at 212. If the device identifier is one of first impression to the wireless router, the method at 214 may include registering the device identifier at the wireless router, for example, by associating the device identifier with a device profile created at 216. The device identifier registered by the wireless router may be referred to as the registered device identifier for the client device. At 218, access privileges for the client device may be set by the wireless router at the device profile. An example device profile and access privileges are described in greater detail with reference to FIGS. 3 and 4.

At 220, the wireless router may transmit a user registration interface to the client device over the wireless local area network for registering the user. The user registration interface may be presented by the client device, such as via a display device. In at least some implementations, the user registration interface may be transmitted to the client device and/or presented at the client device in response to one of the wireless router and the client device discovering the other. In at least some implementations, the wireless router may not transmit the registration interface to the client device, but instead, a program residing at the client device may present the registration interface in response to detecting the wireless router over the wireless local area network. For example, the program residing at the client device may be paired with or operate in cooperation with the wireless router.

At 222, the method may include receiving a user credential at the wireless router from the client device over the wireless local area network. The user credential may be obtained as one or more user inputs directed at the user registration interface presented by the client device. As one example, the user credential may take the form of a user name and/or password, or may be at least based, in part, on a user name and/or password (e.g., a hashed value).

At 224, the user may be registered by storing the user credential at the wireless router associated with a user profile created at 226. The user credential registered by the wireless router may be referred to as the registered user credential for the user. At 228, access privileges for the user may be set by the wireless router at the user profile. An example user profile and access privileges are described in greater detail with reference to FIGS. 3 and 4.

During a usage phase following the registration phase, the client device may request to initiate a communication session. In at least some implementations, a device identifier may form part of the request. The device identifier may be based, at least in part, on a hardware component and/or a software component of the client device. As one example, the device identifier may include a MAC address. The wireless router receives the request to initiate a communication session over the wireless local area network from the client device. At 232, the wireless router may authenticate the client device based, at least in part, on the device identifier. For example, the wireless router may authenticate the client device by comparing the device identifier to the registered device identifier, and if valid grant access to the client device in accordance with the access privileges for the authenticated client device. The wireless router may determine device settings for the authenticated client device based on the device profile stored at the wireless router for the device identifier. The device settings may include or otherwise indicate the access privileges for the client device.

At 234, the wireless router may receive a user credential from the client device over a wireless local area network. The user credential may be transmitted over the wireless local area network by the client device responsive to a challenge issued by the wireless router or by a program executed at the client device. As one example, the challenge may be issued by the wireless router that directs a program executed at the client device to present the login interface by which the user credential is obtained from the user. In at least some implementations, authentication of the user may be performed responsive to the request to initiate the communication session if a threshold period of time has been exceeded since a previous authentication of the user by the wireless router. The wireless router may withhold a challenge to the user if the threshold period of time has not been exceeded. The user may be authenticated during this threshold time period based on one or more of the device identifier and/or an authentication state cookie previously transmitted to the client device and returned by the client device with the request. As one example, the wireless router may maintain a state table, with timers for each client device identifier. As another example, the wireless router may write, store, and transmit to a client device, an authentication state cookie with an encrypted value that identifies authentication state, authentication time, etc. Authentication state cookies may be used, for example, in the context of client devices that employ web browsers to initiate communications with the wireless router and/or WAN.

The user credential may be obtained as one or more user inputs directed at a login interface presented by the client device, for example. At 236, the wireless router may authenticate the user of the client device based, at least in part, on the user credential. The wireless router may determine user settings based, at least in part, on the user profile stored at the wireless router for the authenticated user of the client device. The user settings may include the access privileges for the authenticated user.

At 238, the wireless router may establish the communication session with the authenticated client device, for example, by sending a response to the authenticated client device over the wireless local area network. As part of the response or set of responses by the wireless router, the wireless router may transmit an indication to the authenticated client device of the information resources accessible to the authenticated client device for presentation via a profile interface. The profile interface will be described in greater detail with reference to FIG. 4.

At 240, the client device may request access to an information resource stored at the wireless local area network. The wireless router receives the access request from the client device over the wireless local area network. The wireless router may authenticate a user by comparing the registered user credential to the user credential received from the client device to determine if the user credential is valid.

At 242, the wireless router controls access to the requested information resources stored at the wireless router (or accessible to the wireless router from a remote networking device) during the communication session based, at least in part, on one or more of the device settings (e.g., access privileges) for the authenticated client device and/or the user settings (e.g., access privileges) for the authenticated user. For example, at 244, the wireless router may control access to the information resources by granting the authenticated client device access to a first subset of the information resources stored at the wireless router associated with the device profile as indicated by the device settings, and by denying the authenticated client device access to a second subset of the information resources stored at the wireless router not associated with the device profile as indicated by the device settings.

As indicated at 246, access that is granted to the information resource (e.g., such as an electronic file, session state, or program) may be stored locally at the wireless router or may be served by a local server device via the wireless router. An information resource may also be served by a remote server device over the wide area network. If the information resource resides at a server device that is remote from wireless router, then the wireless router may transmit a request for the information resource over a communications network (e.g., a WAN, LAN, etc.) and receive the information resource as a response. The wireless router transmits the information resource or associated information requested by the client device to the client device over the wireless local area network to fulfill the access request.

Access to the information resources stored at the wireless router during a communication session may be based, at least in part, on both the user settings for the authenticated user and the device settings for the authenticated client device, or may be based on only one of the user settings or the device settings depending on the access privileges associated with the particular information resource. The wireless router may, for example, control access to the information resources by granting the authenticated client device access to a first subset of the information resources associated with both the device profile as indicated by the device settings and the user profile as indicated by the user settings, and may deny the authenticated client device access to a second subset of the information resources not associated with both the device profile and the user profile.

As previously discussed, information resources may include one or more of an electronic file and/or a session state of a prior communication session or program session stored at the wireless router. Access to the electronic file or the session state stored at the wireless router may be controlled by enabling retrieval of the electronic file or continuation of the prior communication session or program session based on the session state by the authenticated client device, or by enabling sharing of the electronic file or the session state by the authenticated client device with another client device indicated by the access privileges. Access control with respect to electronic files may include any suitable type of access control, including write privileges, read privileges, copy privileges, share privileges, etc. The information resources may include a program executed at the wireless router as previously discussed. Access to the program executed at or executable by the wireless router may be controlled, for example, by initiating execution of the program by the authenticated user, enabling program control commands to be passed from the authenticated client device to the program, and/or enabling responses generated by the program to be passed to the authenticated client device.

The wireless router may be configured to store a plurality of device profiles and a plurality of user profiles. If a user utilizes a different client device than used in a prior session to login to the wireless router, the wireless router may receive and store a device identifier of the different client device at the wireless router associated with a different device profile. The device identifier of the different client device may also be associated with the user profile in an account identity as will be described in greater detail with reference to FIG. 3. Accordingly, the wireless router may maintain a record of the various devices operated by each user. Additionally or alternatively, the wireless router may maintain a record of the various users logging in via each client device.

Figure 3:
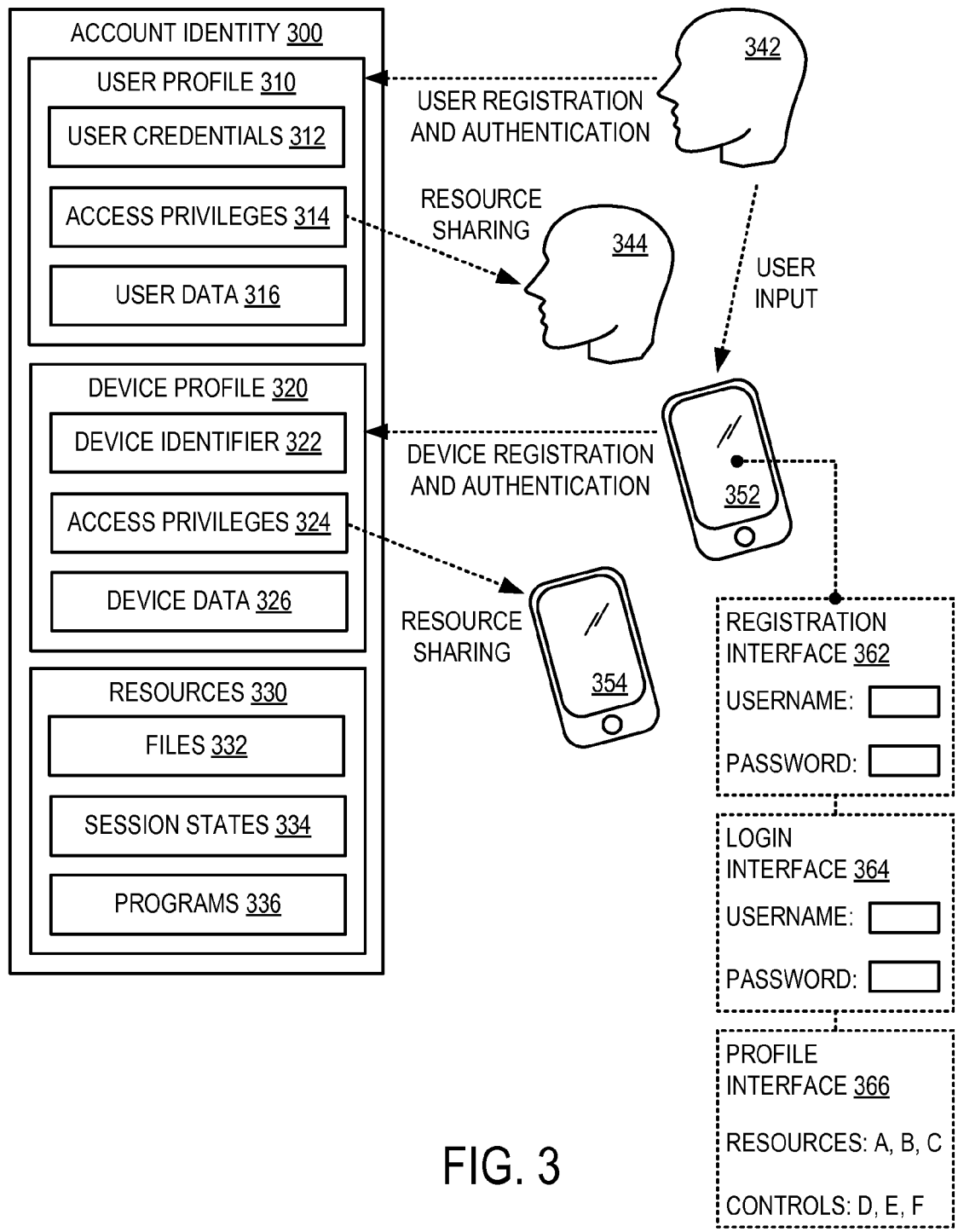
FIG. 3 is a schematic diagram depicting an example account identity according to a disclosed embodiment.

FIG. 3 is a schematic diagram depicting an example account identity 300. Account identity 300 or portions thereof may be stored at a storage system of a wireless router (e.g., data store 128 of wireless router 110) or other suitable networking device that is accessible to the wireless router. Account identity 300 may include one or more of a user profile 310 and/or a device profile 320. Account identity 300 may include or otherwise indicate one or more information resources 330 associated with user profile 310 and/or device profile 320.

User profile 310 may include or be associated with one or more of registered user credentials 312, access privileges 314, and/or user data 316. As previously described with reference to FIG. 2, user credentials may be used by a wireless router to authenticate a user. User credentials 312 may take the form of a user name and/or password, or other suitable information that may be used to authenticate a user. User credentials 312 may be provided by a user as part of a registration process after which the registered user credentials may be compared to user credentials provided by a user in response to a subsequent challenge to determine whether access is to be granted or denied. User data 316 may include or indicate other suitable information to be associated with a user profile including, for example, the user's email address, physical mailing address, telephone number, financial billing information, user preference settings, etc.

Device profile 320 may include or be associated with one or more of a device identifier 322, access privileges 324, and/or device data 326. Device identifier 322 may indicate or may be based on a hardware component and/or a software component of a client device. For example, device identifier 322 may include a MAC address of the client device. Device data 326 may include or indicate any other suitable information to be associated with a device profile including, for example, device capabilities, software version, device configurations, etc. Information resources 330 associated with account identity 300 may include one or more electronic files 332, session states 334, and/or programs 336.

The wireless router may create, store, and reference any suitable number of account identities for one or more users and/or one or more client devices. For example, method 200 of FIG. 2 may be implemented by a wireless router based on information indicated by or associated with one or more account identities. Access privileges 314 of user profile 310 and/or access privileges 324 of device profile 320 (collectively referred to as access privileges of an account identity) may define one or more user profiles and/or one or more device profiles that are to be granted access to information resources 330 or a subset of information resources 330. In order from less limited access control to more limited access control, these access privileges may indicate, with respect to an individual information resource, that access is to be granted only to: (1) any user via any client device; (2) any user via one or more specified client devices associated with device profile 320 and/or other device profiles; (3) one or more specified users associated with user profile 310 and/or other user profiles via any client device; (4) a particular user associated with user profile 310 via any client device; (5) a particular user associated with user profile 310 via one or more specified client devices associated with device profile 320 and/or other device profiles; (6) any user via a particular client device associated with device profile 320; or (7) a particular user associated with user profile 310 via a particular client device associated with device profile 320.

As a non-limiting example, a user 342 may operate a client device 352 to provide user inputs via a registration interface 362 for user registration to establish a user profile at the wireless router, and to provide user inputs via a login interface 364 for user authentication. Device registration may also be performed for client device 352 to establish a device profile at the wireless router, and for authentication of client device 352. User 342 may provide user inputs via a profile interface 346 to select, browse, or otherwise interact with information resources 330 and associated access privileges. For example, profile interface 336 lists information resources "A, B, C" accessible to user 342 via client device 352. Profile interface 336 may also provide one or more user controls "D, E, F" to adjust access privileges or otherwise interact with the wireless router. As one example, to share an information resource with another user, user 342 may grant permission to user 344 that accesses the wireless router via a different client device 354 or via the same client device 352. User 342 may direct user inputs to the user controls of the profile interface to cause the wireless router to add user 344 to (or alternatively remove user 344 from) the access privileges associated with the shared information resource on either a user level, a device level, or a combination of a user level and device level.

Figure 4:
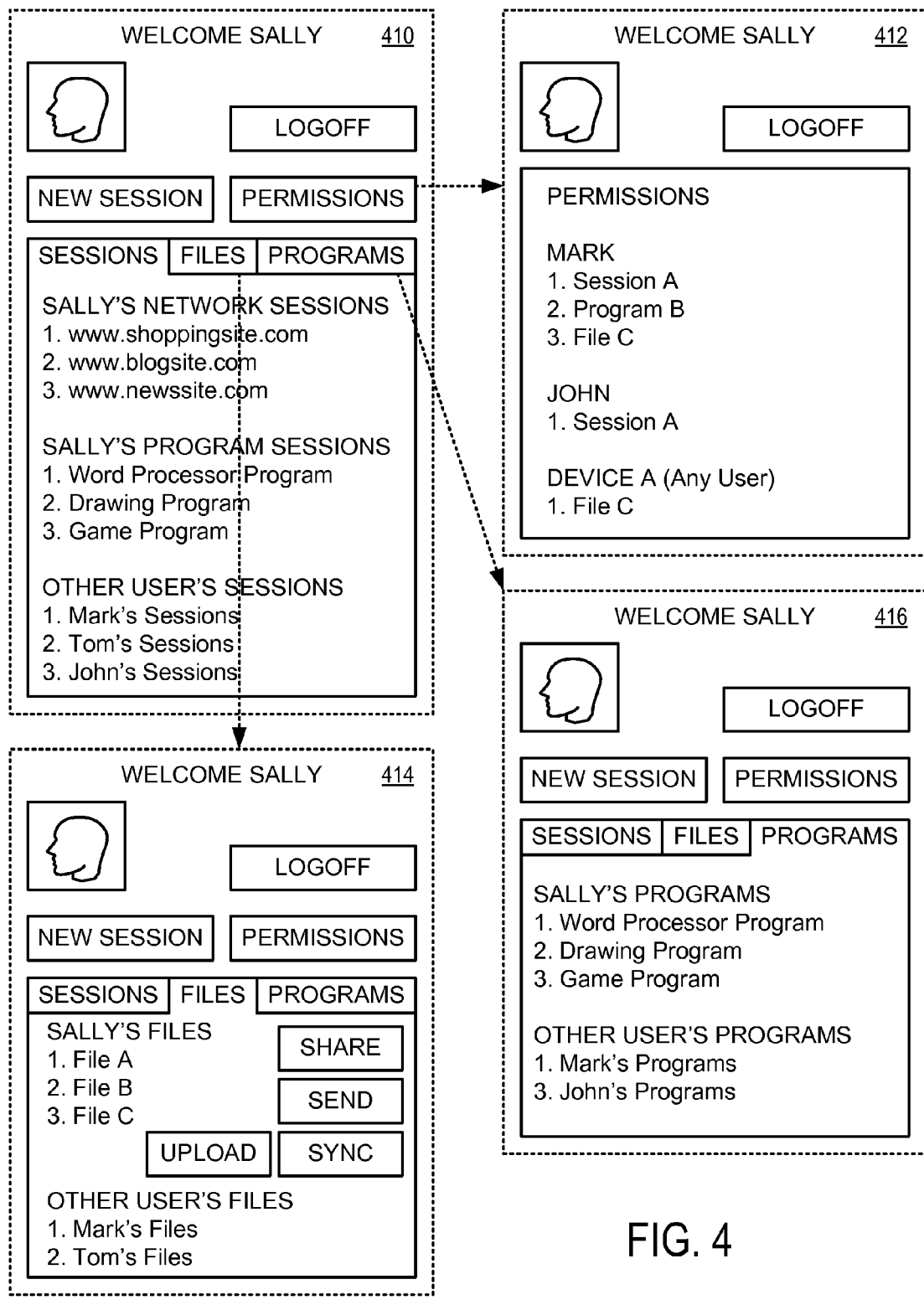
FIG. 4 is a schematic diagram depicting an example sequence of graphical user interfaces forming a profile interface according to one disclosed embodiment.

FIG. 4 is a schematic diagram depicting an example sequence of graphical user interfaces (GUIs) forming a profile interface. The GUIs of FIG. 4 are non-limiting examples of profile interface 366 of FIG. 3. At least some of the information presented via these GUIs may be served or otherwise transmitted to client devices of a wireless local area network by the wireless router. These GUIs may be used to access information resources, manage access privileges among client devices and/or users, and initiate session hand-off and/or sharing of information resources between two or more client devices or between two or more different users of a common client device.

In FIG. 4, GUI 410 includes a sessions list from the perspective of a user profile for user "Sally". The sessions list includes a number of selectable session states, including Sally's network sessions that may be re-established with a server device of the WAN, Sally's program sessions that may be re-established with a program executed at or executable by the wireless router, and other user's sessions that are accessible to Sally based on access privileges set by those other users. The selectable session states may take the form of a graphical element or hyperlink (e.g., URL) to which a user input may be directed in order to re-establish a select session. User Sally may establish a new communications session, for example, by selecting a "New Session" control element.

GUI 412 includes a permissions list from the perspective of the user profile for Sally. The permissions list enables Sally to define access privileges to information resources, including session states, programs, and/or files. GUI 412 includes example access privileges set for other users Mark and John, and for a client device identified as Device A. Mark, for example, has been granted access to Sally's "Session A", "Program B", and "File C". Any user of Device A has been granted access to "File C". A user may navigate to the permissions list of GUI 412 from GUI 410 by directing a user input at a "PERMISSIONS" control element.

GUI 414 includes a files list from the perspective of the user profile for Sally. The files list includes Sally's electronic files stored at the wireless router, and electronic files of other users that are accessible to Sally. For example, Mark may have granted Sally (or a client device operated by Sally) access privileges to one or more electronic files. A user may navigate to the files list of GUI 414 from GUI 410 by directing a user input at a "FILES" control element. These electronic files may include, for example, image files (e.g., .jpg), word processing files (e.g., .doc, .xls, etc.), instructions set files (e.g., .js), among other suitable file types. GUI 414 may include an "UPLOAD" control element to initiate an upload of an electronic file from the client device to the wireless router over the wireless local area network. The uploaded file may be associated with the user profile and/or device profile of the source client device by the wireless router. GUI 414 may include other control elements, such as "SHARE" to initiate sharing of electronic files with other users and/or client devices via the wireless router, "SEND" to initiate transmission of electronic files to other user profiles and/or client devices from or via the wireless router, and "SYNC" to synchronize electronic files across two or more client devices and/or user profiles. These control elements may be included with other GUIs, including GUI 410 for session states and GUI 416 for programs residing at the wireless router, and may be used to initiate sharing, transmission, or synchronization of these information resources between or among client devices and/or user profiles via the wireless router.

GUI 416 includes a programs list from the perspective of the user profile for Sally. The programs list includes Sally's programs residing at the wireless router, and programs of other users residing at the wireless router that are accessible to Sally. For example, Mark may have granted Sally (or a client device operated by Sally) access privileges to one or more programs. A user may navigate to the programs list of GUI 416 from GUI 410 by directing a user input at a "PROGRAMS" control element.

The GUIs of FIG. 4 may be accessed by users via a general purpose or special purpose application program executed at their respective client devices. A special purpose program may be dedicated to controlling and managing the wireless router. A general purpose or multi-purpose application program may take the form of a web browser or file browser, for example. As one example, these GUIs may be presented in a webpage viewing region of a browser, or in a menu system of the browser. As another example, the GUIs of FIG. 4 may be presented in a menu system or task bar of an operating system of a client device.

The example GUIs of FIG. 4 may be accessed by users in a number of ways, such as the through one or more of the previously described APIs. As one example, a user may navigate a client device to a well-known URI, or capture DNS. As another example, a user may enter a URL or URI (e.g., such as a malformed, but easy to remember URI) in a browser address bar (e.g., such as "ROUTER" or "SHARE"). The wireless router may be configured to intercept the DNS query and interpret the query as a SHARE command. In response to the SHARE command, the wireless router may be configured to serve a profile interface (e.g., one or more of the GUIs of FIG. 4) back to the client device that enables the user to share information with another user and/or client device of the LAN.

In at least some implementations, the wireless router may be configured to listen for commands, and serve GUIs in response to requests (e.g., the SHARE command) from a client device. For example, the wireless router may provide a number of functions, such as "SHARE", "SETTINGS", "PICKUP SESSION", etc. Each function may cause the wireless router to return a different functional interface to a client device to be displayed to a user.

In at least some implementations, the wireless router may be configured to transmit data to a client device representing one or more of the registration interface, login interface, profile interface, etc. responsive to receiving a request at a secret address (e.g., URL or URI) of the wireless router that was initiated by the client device. For example, a secret URL may take the form of or may be based on a shared secret between the wireless router and a client device. A secret address may be programmatically generated by the wireless router or by an application operating on the client device, and/or the secret address may be at least partially user defined. A secret address may be changed over time (e.g., periodically or responsive to a condition) to increase security. The wireless router may support one or more secret addresses per device profile and/or one or more secret addresses per user profile. Two or more secret addresses for a given client device may be used to distinguish between two or more different types of functional interfaces that provide access to router different functionality.

The access control techniques and functional interfaces described herein may be used to enable a user to define and adjust quality of service parameters applied at the wireless router for a user profile (representing a user) and/or device profile (representing a client device). As one example, a user profile and/or a device profile may be assigned a maximum bandwidth threshold (e.g., maximum data rate) and/or a minimum bandwidth threshold (e.g., minimum data rate) for accessing resources of the WAN via the wireless router over the LAN. Quality of service parameters may be defined and controlled on a per user profile basis and/or a per device profile basis. Accordingly, users and/or client devices may communicate with the wireless router and/or WAN resources via the wireless router at different data rates based, at least in part, on the quality of service parameters assigned to those users and/or client devices. In at least some implementations, a user profile may take the form of an administrative user profile that has the ability to define and adjust quality of service parameters that are applied to other user profiles and/or device profiles by the wireless router. The wireless router may be configured to apply quality of service parameters by throttling bandwidth of at least some users and/or client devices so that communications do not exceed a maximum bandwidth threshold and/or so that a minimum bandwidth threshold is guaranteed for other users and/or client devices.

The access control techniques and functional interfaces described herein may be used with features described in greater detail in U.S. patent application Ser. No. 13/309,505, titled GATEWAY ROUTER SUPPORTING SESSION HAND-OFF AND CONTENT SHARING AMONG CLIENTS OF A LOCAL AREA NETWORK, filed Dec. 1, 2011, and U.S. patent application Ser. No. 13/367,556, titled APPLICATION PROGRAMMING INTERFACE FOR ENHANCED WIRELESS LOCAL AREA NETWORK ROUTER, filed Feb. 7, 2012, the entire contents of which are incorporated herein by reference in their entirety for all purposes.

It should be understood that the embodiments herein are illustrative and not restrictive, since the scope of the invention is defined by the appended claims rather than by the description preceding them. All changes that fall within metes and bounds of the claims or equivalence of such metes and bounds thereof are therefore intended to be embraced by the claims.

The invention claimed is:
1. A wireless router, comprising:
a communications interface to provide a wireless local area network for one or more client devices to access a wide area network via the wireless router, the communications interface supporting communications between one or more client devices of the wireless local area network and network server devices of the wide area network;

a storage system including a data store and executable instructions stored thereon, the data store including one or more account identities and further including one or more information resources and access privileges associated with the one or more account identities for the one or more information resources; and a processor system to execute the executable instructions to:

during a registration phase:

detect via the wireless local area network, a first device identifier of a first client device of the one or more client devices, associate the first device identifier of the first client device with a device profile of an account identity of the one or more account identities of the storage system, transmit a user registration interface to the first client device via the wireless local area network for presentation, receive a user credential of a first user from the first client device via the wireless local area network, the user credential obtained at the first client device as one or more user inputs directed at the user registration interface presented by the first client device, associate the user credential with a user profile of the account identity, set the access privileges associated with the device profile and the user profile of the account identity for the one or more information resources, and during a usage phase following the registration phase:

detect via the wireless local area network, the first device identifier of the first client device, authenticate the first client device and the first user of the first client device based, at least in part, on the first device identifier detected via the wireless local area network during the usage phase, and following authentication of the first client device and the first user of the first client device, transmit a profile interface to the first client device via the wireless local area network for presentation, the profile interface indicating information resources associated with the account identity, access privileges associated with the account identity, and controls for accessing the information resources and managing the access privileges associated with the account identity, the information resources associated with the account identity including a session state of a prior communication session between the first client device of the wireless local area network and a network server device of the wide area network via the wireless router;

receive a request from the first client device over the local area network responsive to a user input received via the controls of the profile interface presented at the first client device for managing the access privileges associated with the account identity, the request indicating a second client device or a second user to be granted access to the session state of the prior communication session, the second client device or the second user having previously registered with the wireless router; and responsive to the request, set the access privileges associated with the second client device or the second user at the data store of the storage system to grant access to the session state of the prior communication session.

2. The wireless router of claim 1, wherein the processor system is to further execute the executable instructions to authenticate the first client device and the first user of the first client device based further upon the user credential received from the first client device via the wireless local area network during the usage phase following the registration phase.

3. The wireless router of claim 1, wherein the processor system is to further execute the executable instructions to:

detect via the wireless local area network, a second device identifier of the second client device;

authenticate the second client device based, at least in part, on the second device identifier detected via the wireless local area network; and following authentication of the second client device, transmit a second profile interface to the second client device via the wireless local area network for presentation, the second profile interface indicating the session state and controls for accessing the session state at the second client device.

4. The wireless router of claim 3, wherein the processor system is to further execute the executable instructions to:

facilitate continuation of the prior communication session between the second client device and the network server device via the wireless router responsive to the session state being accessed at the second client device.

5. The wireless router of claim 1, wherein the processor system is to further execute the executable instructions to:

authenticate the second user based upon a user credential of the second user received from a client device operated by the second user via the wireless local area network; and following authentication of the second user, transmit a second profile interface to the client device operated by the second user via the wireless local area network for presentation, the second profile interface indicating the session state and controls for accessing the session state at the client device operated by the second user.

6. The wireless router of claim 5, wherein the processor system is to further execute the executable instructions to:

facilitate continuation of the prior communication session between the client device operated by the second user and the network server device via the wireless router responsive to the session state being accessed by the second user.

7. The wireless router of claim 1, wherein the request indicates a combination of the second client device and the second user to be granted access to the session state of the prior communication session, the second client device and the second user having previously registered with the wireless router; and wherein the processor system is to further execute the executable instructions to: responsive to the request, set the access privileges associated with the combination of the second client device and the second user at the data store of the storage system to grant access to the session state of the prior communication session.

8. The wireless router of claim 7, wherein the processor system is to further execute the executable instructions to:

detect via the wireless local area network, a second device identifier of the second client device;

authenticate the second client device based, at least in part, on the second device identifier detected via the wireless local area network;

authenticate the second user based upon a user credential of the second user received from the second client device via the wireless local area network;

following authentication of the combination of the second client device and the second user, transmit a second profile interface to the second client device via the wireless local area network for presentation, the second profile interface indicating the session state and controls for accessing the session state at the second client device; and facilitate continuation of the prior communication session between the second client device and the network server device via the wireless router responsive to the session state being accessed at the second client device.

9. A method for a wireless router, the method comprising:
during a registration phase:
   detecting via a wireless local area network, a first device identifier of a first client device of one or more client devices;
   associating the first device identifier of the first client device with a device profile of an account identity of the one or more account identities at the storage system of the wireless router;
   transmitting a user registration interface to the first client device via the wireless local area network for presentation;
   receiving a user credential of a first user from the first client device via the wireless local area network, the user credential obtained at the first client device as one or more user inputs directed at the user registration interface presented by the first client device;
   associating the user credential with a user profile of the account identity;
   setting access privileges associated with the device profile and the user profile of the account identity for the one or more information resources stored at the storage system of the wireless router; and
during a usage phase following the registration phase:
   detecting via the wireless local area network, the first device identifier of the first client device;
   authenticating the first client device and the first user of the first client device based, at least in part, on the first device identifier detected via the wireless local area network during the usage phase; and
   following authentication of the first client device and the first user of the first client device, transmit a profile interface to the first client device via the wireless local area network for presentation, the profile interface indicating information resources associated with the account identity, access privileges associated with the account identity, and controls for accessing the information resources and managing the access privileges associated with the account identity, the information resources associated with the account identity including a session state of a prior communication session between the first client device of the wireless local area network and a network server device of the wide area network via the wireless router;
   receiving a request from the first client device over the local area network responsive to a user input received via the controls of the profile interface presented at the first client device for managing the access privileges associated with the account identity, the request indicating a second client device or a second user to be granted access to the session state of the prior communication session, the second client device or the second user having previously registered with the wireless router; and
   responsive to the request, setting the access privileges associated with the second client device or the second user at the data store of the storage system to grant access to the session state of the prior communication session.

10. The method of claim 9, further comprising:
authenticating the first client device and the first user of the first client device based further upon the user credential received from the first client device via the wireless local area network during the usage phase following the registration phase.

11. The method of claim 9, further comprising:
detecting via the wireless local area network, a second device identifier of the second client device;
authenticating the second client device based, at least in part, on the second device identifier detected via the wireless local area network; and
following authentication of the second client device, transmitting a second profile interface to the second client device via the wireless local area network for presentation, the second profile interface indicating the session state and controls for accessing the session state at the second client device.

12. The method of claim 11, further comprising:
facilitating continuation of the prior communication session between the second client device and the network server device via the wireless router responsive to the session state being accessed at the second client device.

13. The method of claim 9, further comprising:
authenticating the second user based upon a user credential of the second user received from a client device operated by the second user via the wireless local area network; and
following authentication of the second user, transmitting a second profile interface to the client device operated by the second user via the wireless local area network for presentation, the second profile interface indicating the session state and controls for accessing the session state at the client device operated by the second user.

14. The method of claim 13, further comprising:
facilitating continuation of the prior communication session between the client device operated by the second user and the network server device via the wireless router responsive to the session state being accessed by the second user.

15. The method of claim 9, further comprising:
wherein the request indicates a combination of the second client device and the second user to be granted access to the session state of the prior communication session, the second client device and the second user having previously registered with the wireless router; and
wherein the method further comprises, responsive to the request, setting the access privileges associated with the combination of the second client device and the second user at the data store of the storage system to grant access to the session state of the prior communication session.

16. The method of claim 15, further comprising:
detecting via the wireless local area network, a second device identifier of the second client device;
authenticating the second client device based, at least in part, on the second device identifier detected via the wireless local area network;
authenticating the second user based upon a user credential of the second user received from the second client device via the wireless local area network;
following authentication of the combination of the second client device and the second user, transmitting a second profile interface to the second client device via the wireless local area network for presentation, the second profile interface indicating the session state and controls for accessing the session state at the second client device; and facilitating continuation of the prior communication session between the second client device and the network server device via the wireless router responsive to the session state being accessed at the second client device.

* * * * *